United States Patent
Novelli

(10) Patent No.: US 10,791,878 B2
(45) Date of Patent: *Oct. 6, 2020

(54) CAKE MAKING IMPLEMENT FOR SMOOTHING ICING

(71) Applicant: Arlette Novelli, Foster City, CA (US)

(72) Inventor: Arlette Novelli, Foster City, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 15/630,852

(22) Filed: Jun. 22, 2017

(65) Prior Publication Data
US 2017/0280743 A1    Oct. 5, 2017

Related U.S. Application Data

(63) Continuation of application No. 14/666,317, filed on Mar. 24, 2015, now Pat. No. 9,717,263.

(51) Int. Cl.
| | | |
|---|---|---|
| *A23G 3/28* | (2006.01) | |
| *A47J 43/28* | (2006.01) | |
| *A23P 20/15* | (2016.01) | |
| *A21C 15/00* | (2006.01) | |

(52) U.S. Cl.
CPC ............ *A47J 43/288* (2013.01); *A21C 15/002* (2013.01); *A23G 3/28* (2013.01); *A23P 20/15* (2016.08)

(58) Field of Classification Search
CPC .......... A23G 3/28; A23G 3/20; A23G 3/0097; A21C 15/002; A21C 15/04; A23P 20/10; A47J 43/288; B05C 11/04; B05C 11/041; B05C 11/044; B05C 11/045
USPC .......... 118/13, 14, 15, 16; 294/7; 15/236.06, 15/236.09; 83/651.1, 874, 932; 30/296.1, 287, 300, 304, 117
See application file for complete search history.

(56) References Cited

U.S. PATENT DOCUMENTS

| | | | |
|---|---|---|---|
| 1,472,022 A | 10/1923 | Cockbill et al. | |
| 3,420,210 A * | 1/1969 | Lindquist ................. | A23G 3/28 118/18 |
| 4,266,501 A * | 5/1981 | Knupp ................. | A21C 15/002 118/15 |
| 9,456,614 B1 * | 10/2016 | Bell ..................... | A21C 15/002 |
| 2013/0115850 A1 * | 5/2013 | Sloop ....................... | A45F 3/44 446/397 |
| 2016/0205953 A1 | 7/2016 | Nguyen | |

* cited by examiner

*Primary Examiner* — Reginald Alexander
(74) *Attorney, Agent, or Firm* — Dergosits & Noah LLP

(57) ABSTRACT

A cake icing implement is disclosed for simultaneously smoothing icing on a top surface and a side surface of a cake. The cake icing implement may include a top smoother connected to a side smoother and configured to move with respect to the side smoother. The top smoother may be adapted to smooth the top surface of the cake. The side smoother may be adapted to smooth the side surface of the cake up to the top surface.

21 Claims, 5 Drawing Sheets

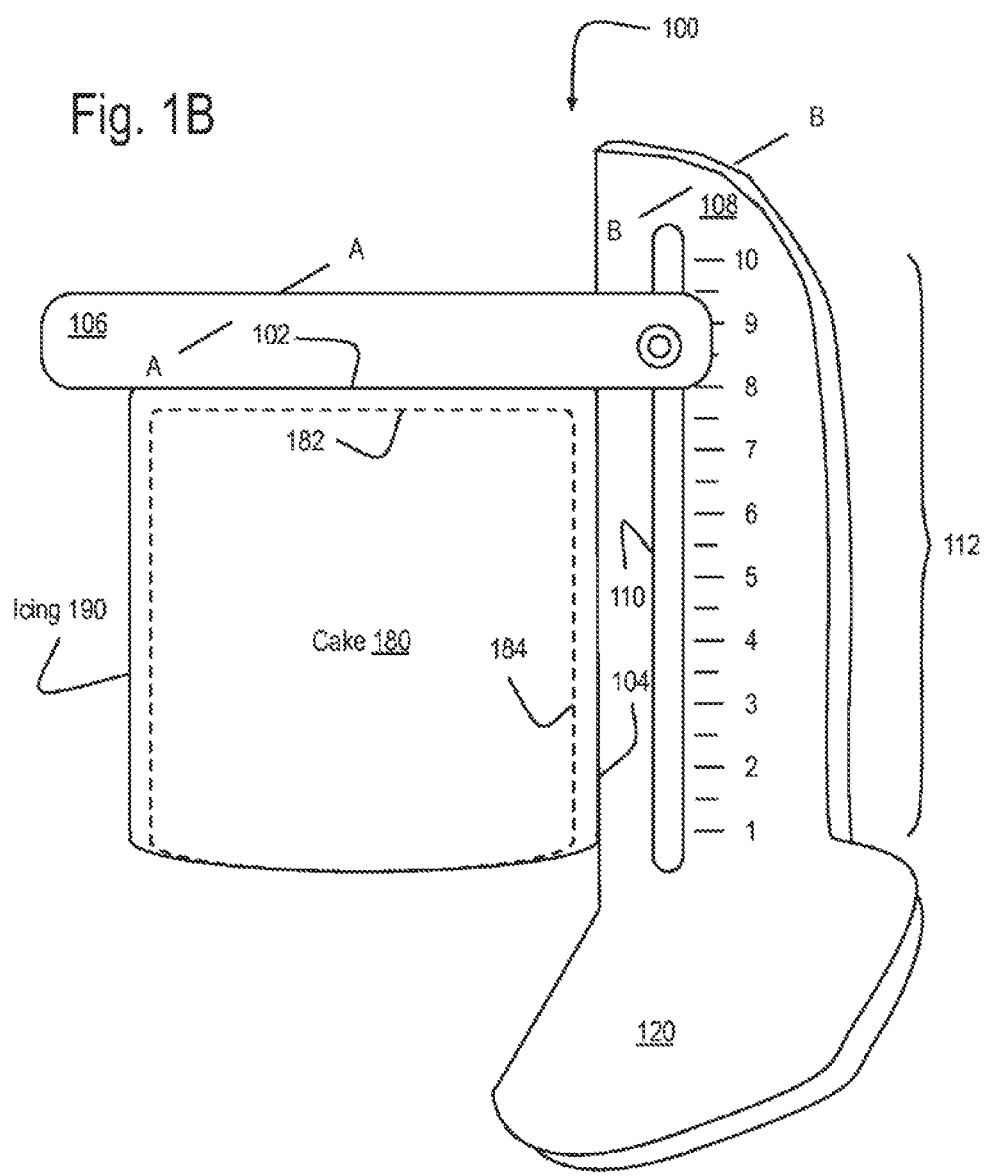

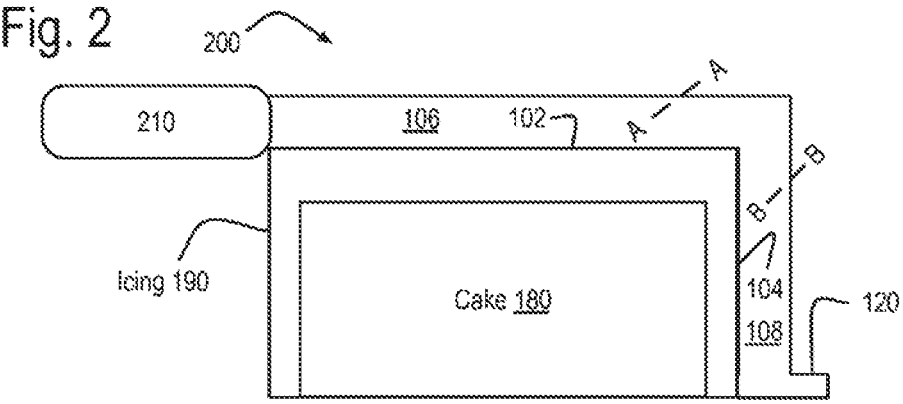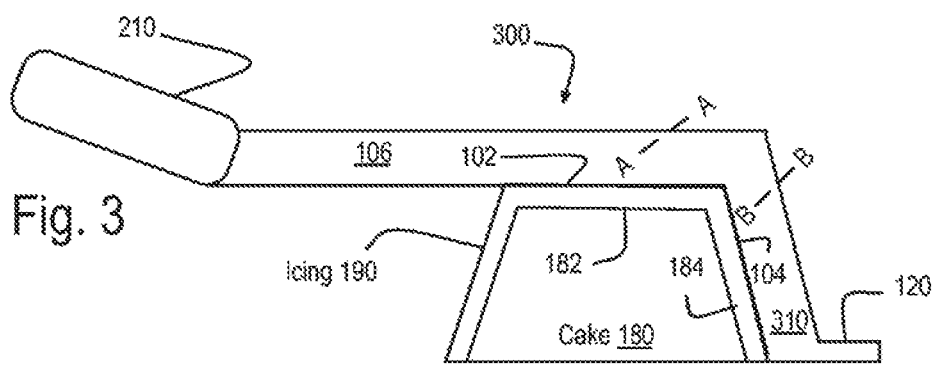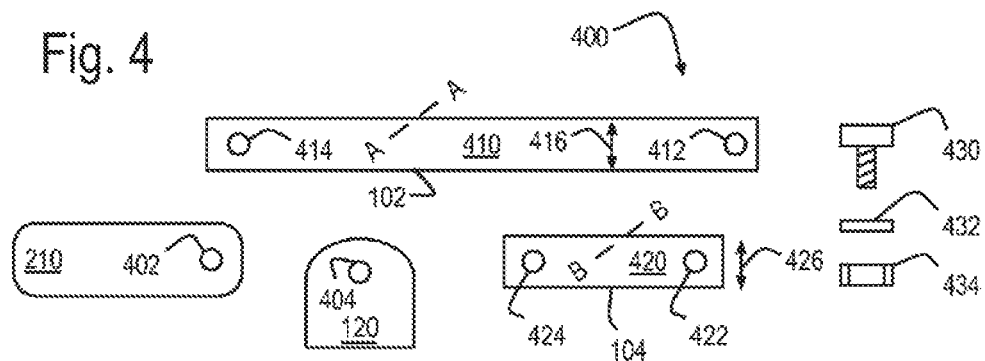

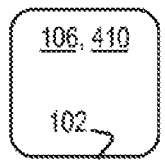 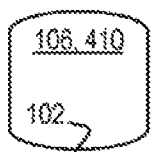 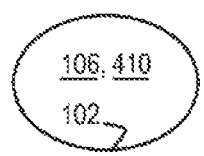 
Fig. 9A    Fig. 9B    Fig. 9C    Fig. 9D
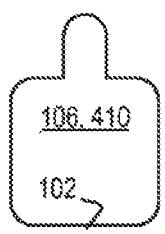  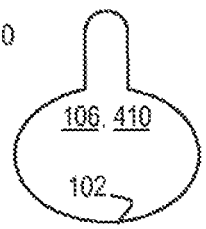 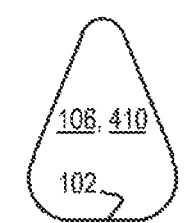
Fig. 9E    Fig. 9F    Fig. 9G    Fig. 9H
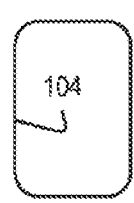 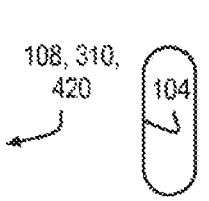 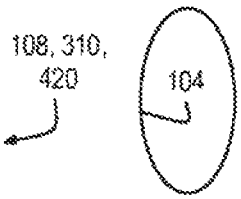 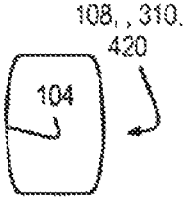
Fig. 10A    Fig. 10B    Fig. 10C    Fig. 10D
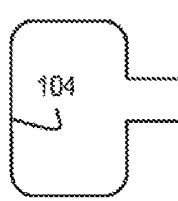 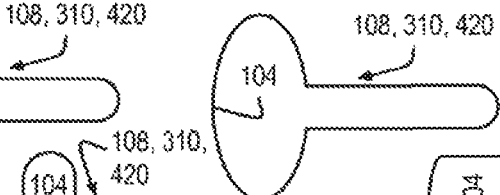 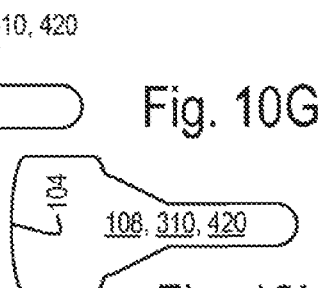 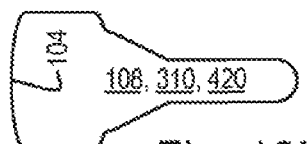
Fig. 10E    Fig. 10F    Fig. 10G    Fig. 10H

CAKE MAKING IMPLEMENT FOR SMOOTHING ICING

CROSS REFERENCE TO RELATED APPLICATIONS

The present application is a continuation of pending U.S. application Ser. No. 14/666,317, filed on Mar. 24, 2015, entitled "Cake Making Implement," which is incorporated by reference in its entirety.

BACKGROUND OF THE INVENTION

The present invention relates generally to cake making implements and more specifically to cake making implements for smoothing coating(s) on cakes.

Many cake makers (including professional and amateur cake makers) constantly seek perfection in the art of cake making. Cake makers desire to make perfect cakes that are not only delectable but that are visually appealing as well.

Among others, one way to make a visually appealing cake is to apply a coating of icing. A typical user begins by using a spatula or the like to place the icing onto the cake. The user then begins smoothing the icing on a surface, for instance, a side surface. After that, the user begins smoothing the icing on a top surface. Subsequently, the user examines the relationship between the icing on the top surface with the side surface, which may lead the user to further refine the icing covering the top and/or the side surface.

It is within the aforementioned context that a need for the present invention has arisen. The specific need and how this invention addresses that need are discussed in the Summary and Detailed Description that follows.

BRIEF SUMMARY OF THE INVENTION

Various aspects of a cake making implement can be found in exemplary embodiments of the present invention.

In a first embodiment, the cake making implement includes a base, a mostly vertical arm, and a top smoother. The base positions on a flat surface and supports the mostly vertical arm, which extends substantially vertical from the base. An interior edge of the mostly vertical arm includes a side smoother for smoothing the side of a cake. The cake making implement also includes a top smoother that is substantially perpendicular to the mostly vertical arm, the top smoother having an edge for smoothing a top surface of the cake.

In this manner, the cake making implement can be used to smooth icing or other layers simultaneously on the top surface and the side surface unlike conventional cake making implements. This allows the user to proceed with examining the relationship between top surface and the side surface in one step. By smoothing both surfaces at the same time, the user saves not only time but also enjoys the advantage of having the desired relationship between these surfaces built into the cake making implement and its smoothing of the surfaces. The result of operating the cake making implement is a cake with sharp edges and the top of the cake is level to support another cake layer on top of the cake. This reduces the need for a cake maker to use a level to be sure the cake is straight to support a top tier.

In another embodiment, the apparatus may include a cake making implement again used to simultaneously smooth icing on a top surface and a side surface of a cake. The cake making implement may include a top smoother and a side smoother. The top smoother is adapted to smooth the icing on the top surface. The side smoother is adapted to smooth the icing on the side surface.

The apparatus may also include a kit that may include at least one of a top arm, a side arm, the top smoother, the mostly vertical arm, the side smoother, the base and/or a handle.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

BRIEF DESCRIPTION OF THE DRAWINGS

FIG. 1B illustrates the cake making implement of FIG. 1A with the top smoother and/or the top arm at a second of multiple heights.

FIG. 2 illustrates a cake making implement according to an exemplary embodiment of the present invention.

FIG. 3 illustrates the cake smoothing implement of FIG. 2 of the present invention in which the side smoother is operated at a fixed angle to the side surface that is not vertical.

FIG. 4 illustrates a kit as another of the exemplary embodiments of the present invention.

FIG. 9A illustrates the cross section A-A of one or more of the top arms that may be essentially rectangular and may include the top smoother as an essentially flat surface rounded at the sides.

FIG. 9B illustrates the cross section A-A of one or more of the top arms that may be rectangular with two sides rounded and may include the top smoother as a rounded surface.

FIG. 9C illustrates the cross section A-A of one or more of the top arms that may be essentially oval and may include the top smoother as an essentially oval surface.

FIG. 9D illustrates the cross section A-A of one or more of the top arms that may be rectangular with opposing rounded sides away from the top smoother.

FIG. 9E illustrates the cross section A-A of one or more of the top arms that may be essentially rectangular with a protruding finger.

FIG. 9F illustrates the cross section A-A of one or more of the top arms that may be rectangular with rounded sides away from the top smoother and with a protruding finger.

Figure 1A:
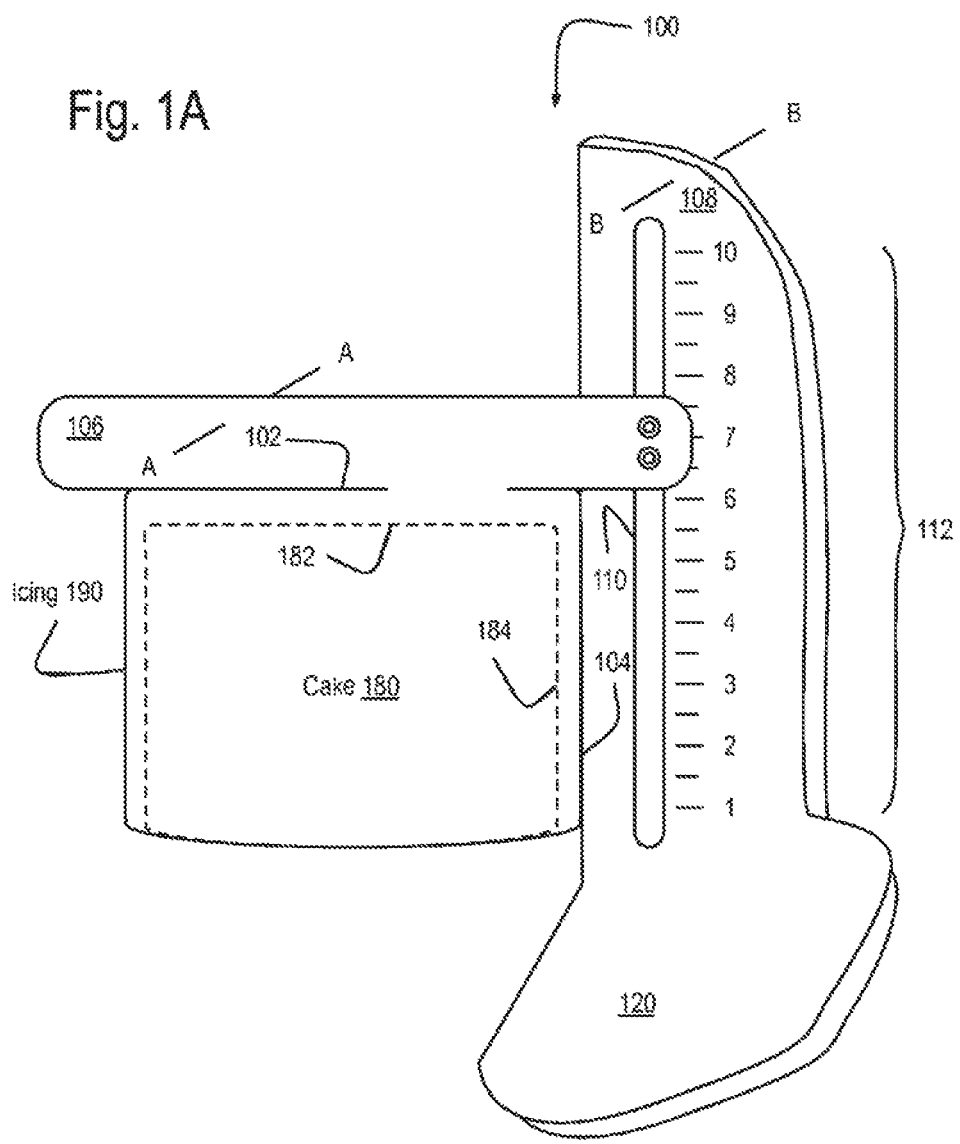
FIG. 1A illustrates a cake making implement according to an exemplary embodiment of the present invention.

The cross section A-A of one or more of the top arms may include the top smoother as an essentially flat surface rounded at the sides.

FIG. 9G illustrates the cross section A-A of one or more of the top arms that may be an oval with a protruding finger. The cross section A-A of one or more of the top arms may include the top smoother as an oval surface.

FIG. 9H illustrates the cross section A-A of one or more of the top arms that may be essentially triangular with rounded edges and may include the top smoother as an essentially flat surface rounded at the sides.

FIG. 10A illustrates the cross section B-B of the mostly vertical arm and/or one or more of the side arms that may be essentially rectangular and may include the side smoother as an essentially flat surface rounded at the sides.

FIG. 10B illustrates the cross section B-B of the mostly vertical arm and/or one or more of the side arms that may be rectangular with two sides rounded and may include the side smoother as a rounded surface.

FIG. 10C illustrates the cross section B-B of the mostly vertical arm and/or one or more of the side arms that may be essentially oval and may include the side smoother as an essentially oval surface.

FIG. 10D illustrates the cross section B-B of the mostly vertical arm and/or one or more of the side arms that may be rectangular with opposing rounded sides near or opposite the side smoother. The cross section B-B of the mostly vertical arm and/or one or more of the side arms may include the side smoother as a rounded surface located between the essentially flat sides.

FIG. 10E illustrates the cross section B-B of the mostly vertical arm and/or one or more of the side arms that may be essentially rectangular with a protruding finger. The cross section B-B of the mostly vertical arm and/or one or more of the side arms may include the side smoother as an essentially flat surface rounded at the sides.

FIG. 10F illustrates the cross section B-B of the mostly vertical arm and/or one or more of the side arms that may be rectangular with rounded sides away from the side smoother and with a protruding finger. The cross section B-B of the mostly vertical arm and/or one or more of the side arms may include the side smoother as an essentially flat surface rounded at the sides.

FIG. 10G illustrates the cross section B-B of the mostly vertical arm and/or one or more of the side arms that may be an oval with a protruding finger. The cross section B-B of the mostly vertical arm and/or one or more of the side arms may include the side smoother as an oval surface.

FIG. 10H illustrates the cross section B-B of the mostly vertical arm and/or one or more of the side arms that may be essentially rectangular shape merged with a triangular shape extended to a finger with rounded edges and may include the side smoother as a rounded surface.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail so as to not unnecessarily obscure aspects of the present invention.

FIG. 1A illustrates a cake making implement 100 according to an embodiment of the present invention.

In FIG. 1A, the cake making implement 100 includes a base 120, a mostly vertical arm 108, and a top smoother 102. The base 120 may be attached to the mostly vertical arm 108. The mostly vertical arm 108 may include a side smoother 104 and a track 110 attached to the top smoother 102 to smooth icing 190 on the top surface 182 at one of multiple heights. The side smoother 104 may be adapted to smooth the icing on the side surface 184 up to the top surface 182.

In FIG. 1A, the cake making implement 100 may be used to simultaneously smooth the icing 190 on the top surface 182 and the side surface 184 of the cake 180.

In operation, the cake making implement 100 may be operated as follows: the cake 180 may be positioned close to the mostly vertical arm 108. The icing 190 may be supplied to the top surface 182 and the side surface 184. The side smoother 104 contacts the icing 190 on the side surface 184 and the top smoother 102 contacts the icing 190 on the top surface 182, which may include adjusting the height of the top arm 105 and/or the top smoother 102 possibly based upon readings of a scale 112 located on the mostly vertical arm 108.

In FIG. 1A, the cake 180 may be rotated about its center to effect simultaneous smoothing the icing 190 on the top surface 182 and the side surface 184 by the cake making implement 100. Alternatively, the cake 180 may be stationary and the cake making implement 100 may circle the cake to simultaneously smooth the icing 190 on the top surface 182 and the side surface 184.

In FIG. 1A, the mostly vertical arm 108 and/or base 120 may be made of a plastic, preferably a food safe plastic, and/or may include a metallic surface such as stainless steel. The side smoother 104 may be made of a plastic, preferably a food safe plastic, and/or a metallic surface such as stainless steel. The top smoother 102 and/or the top arm 106 may be made of plastic, preferably a food safe plastic and/or may include a metallic surface such as stainless steel. Sometimes, it is useful for the top smoother 102 and the side smoother 104 may be sharp and thin to improve the chance of not ripping or pulling the icing off of the surface of the cake. The top smoother 102 and/or the side smoother 104 may include a stainless steel blade or sheet, possibly of 18/8 stainless steel with a square edge, or possibly a knife edge.

In FIG. 1A, the top smoother 102 may be part of a top arm 106. The top arm 106 may have a profile in cross section A-A which further provides at least part of the structure to the top smoother 102. The cross section A-A is illustrated and discussed with regards to FIG. 9A to FIG. 9H below. The top arm 106 may couple to the mostly vertical arm by two fasteners, for example, rivets.

In FIG. 1A, the side smoother 104 and/or the mostly vertical arm 108 may have a cross section B-B that further provides at least part of the structure to the side smoother 104. The cross section B-B is illustrated and discussed with regards to FIG. 10A to FIG. 10H below. The side smoother 104 may include a stainless steel blade or sheet, possibly of 18/8 steel with a square edge, or possibly a knife edge.

In FIG. 1A, the mostly vertical arm 108 may include the base 120 in some embodiments. Alternatively, the base 120 may be able to be separated from the mostly vertical arm 108. In yet other embodiments, the mostly vertical arm may include a scale 112 that can be used to delineate the height of the cake 180 and/or the height of the top smoother.

FIG. 1B illustrates the cake making implement 100 of FIG. 1A used to smooth icing 190 simultaneously on a top surface 182 and a side surface 184 of a cake 180, with the top smoother 102 and/or the top arm 106 at a second of multiple heights possibly determined through the use of the scale 112. The top arm 106 may couple to the mostly vertical arm by a single coupling, for example, a nut and bolt arrangement, possibly with a washer.

In FIG. 1A and FIG. 1B, the top smoother 102 and the side smoother 104 are essentially perpendicularly disposed towards each other. In some implementations, the coupling of the top arm 106 to the mostly vertical arm 108 may include a single bolt as shown, but could alternatively be a single or pair of bolts and/or rivets. Also, the top arm 106 may be formed to include a tab that rides in the slot 110 to further insure that the top smoother 102 is always horizontal to the table on which the cake 180 rests.

FIG. 2 illustrates one implementation of an embodiment of the present invention as a cake making implement 200 used to simultaneously smooth icing 190 on the top surface 182 and a side surface 184 of a cake 180, with the top surface at a single, fixed height.

In FIG. 2, the cake making implement 200 includes a base 120 included in a mostly vertical arm 108 attached to a top arm 106 including the top smoother 102. The cake making implement 200 may also include a handle 210 attached to the top arm 106. The handle 210 may be disposed essentially horizontal to the base of the cake 180.

In FIG. 2, the top arm 106 may have a cross section A-A to further implement the top smoother 102. The mostly vertical arm 108 may have a cross section B-B to further implement the side smoother 104. The cross section A-A is illustrated and discussed with regards to FIG. 9A to FIG. 9H shortly. The cross section B-B is illustrated and discussed with regards to FIG. 10A to FIG. 10H shortly.

In FIG. 1A, the cake making implement 100 may be used to simultaneously smooth the icing 190 on the top surface 182 and the side surface 184 of the cake 180. The cake making implement 100 may be operated as follows: the cake 180 may be positioned close to the mostly vertical arm 108. The icing 190 may be supplied to the top surface 182 and the side surface 184. The side smoother 104 contacts the icing 190 on the side surface 184 and the top smoother 102 contacts the icing 190 on the top surface 182, which may include adjusting the height of the top arm 105 and/or the top smoother 102 possibly based upon readings of a scale 112 located on the mostly vertical arm 108.

In FIG. 2, the cake 180 may be rotated about its center to effect simultaneous smoothing the icing 190 on the top surface 182 and the side surface 184 by the cake making implement 100. Alternatively, the cake 180 may be stationary and the cake making implement 100 may circle the cake to simultaneously smooth the icing 190 on the top surface 182 and the side surface 184.

In FIG. 2, the mostly vertical arm 108 and base 120 may be made of a plastic, preferably a food safe plastic, and/or may include a metallic surface such as stainless steel. The side smoother 104 may be made of a plastic, preferably a food safe plastic, and/or a metallic surface such as stainless steel. The top smoother 102 and/or the top arm 106 may be made of plastic, preferably a food safe plastic and/or may include a metallic surface such as stainless steel.

FIG. 3 illustrates another implementation of the second embodiment of the present invention in which the side smoother 104 is operated at a fixed angle to the side surface 184 that is not vertical. The side arm 310 may include the side smoother. The side arm 310 may have a cross section B-B. The cross section B-B is illustrated and discussed with regards to FIG. 10A to FIG. 10H shortly.

In FIG. 3, the handle 210 may be disposed at a non-horizontal angle to the base of the cake 180.

In FIG. 3, the cake 180 may be rotated about its center to effect simultaneous smoothing the icing 190 on the top surface 182 and the side surface 184 by the cake making implement 100. Alternatively, the cake 180 may be stationary and the cake making implement 100 may circle the cake to simultaneously smooth the icing 190 on the top surface 182 and the side surface 184.

In FIG. 3, the mostly vertical arm 108 and base 120 may be made of a plastic, preferably a food safe plastic, and/or may include a metallic surface such as stainless steel. The side smoother 104 may be made of a plastic, preferably a food safe plastic, and/or a metallic surface such as stainless steel. The top smoother 102 and/or the top arm 106 may be made of plastic, preferably a food safe plastic and/or may include a metallic surface such as stainless steel.

FIG. 4 illustrates a kit 400 as another of the exemplary embodiments of the present invention.

In FIG. 4, the kit 400 may include a at least one of a top arm 410, a top smoother 102, a side arm 420, a side smoother 104, a base 120 and/or a handle 210. The base 120 may include one or more base reference holes 404 to be used in some situations to align and/or hold the side arm 420. The top smoother 102 may be part of a top arm 410. The top arm 410 may include one or more handle attachment holes 414 and/or one or more side arm attachment holes 412. The top arm 410 may have a cross section A-A to further implement the top smoother 102. The cross section A-A is illustrated and discussed with regards to FIG. 9A to FIG. 9H shortly.

In FIG. 4, the side arm 420 may include the side smoother 104. The side arm 420 may include a base mounting site 424 and/or a top arm mounting site 422. The base reference hole(s) 404 may be used to attach the base 120 through the base mounting site 424 to the side arm 420. The side arm 420 may have a cross section B-B to further implement the side smoother 104. The cross section B-B is illustrated and discussed with regards to FIG. 10A to FIG. 10H shortly.

In FIG. 4, the handle 210 may include a handle alignment site 402. The kit 400 may further include one or more bolts 430, washers 432 and/or nuts 434. Also, the kit 400 may include an implement 300 such as shown in FIG. 3 including a single component providing the top smoother 102, the side smoother 104, and/or the base 120.

Figure 5:
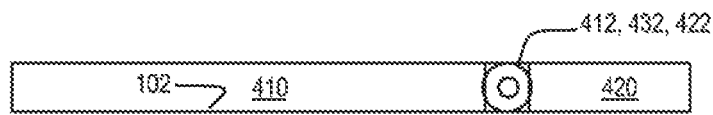
FIG. 5 illustrates an exemplary embodiment of the present invention as a partial assembly of the components of the kit of FIG. 4, with the top arm attached through the handle alignment hole separated by a washer to the top arm mounting site of the top arm.

FIG. 5 illustrates an exemplary embodiment of the present invention as a partial assembly of the components of the kit 400 of FIG. 4, with the top arm 410 attached through the handle alignment hole 412, separated by a washer 432, to the top arm mounting site 422 of the top arm 410.

Figure 6:
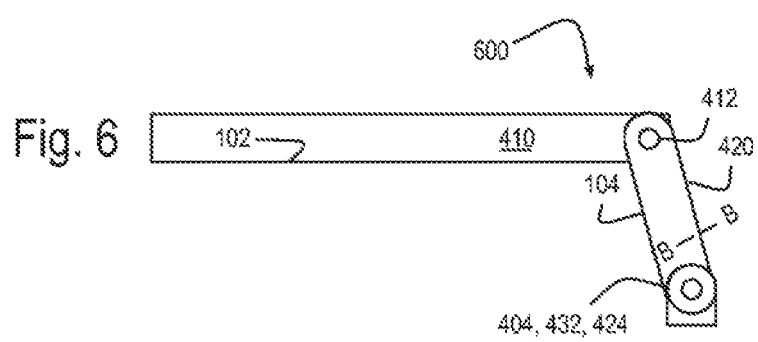
FIG. 6 illustrates a refinement of the assembly of FIG. 5, with the base of FIG. 4 aligned the base mounting site to position the base with respect to the side arm.

FIG. 6 illustrates a refinement of the assembly of FIG. 5, with the base 120 of FIG. 4 aligned by the base reference holes 404 through a washer 432 to the base mounting site 424 to position the base 120 with respect to the side arm 420.

Figure 7:
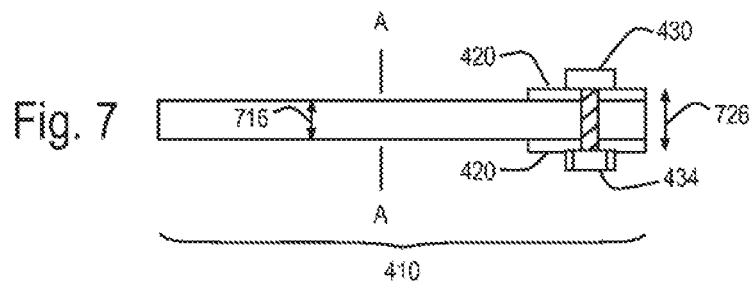
FIG. 7 illustrates a top view of the assembly of FIG. 5 and/or FIG. 6.

FIG. 7 illustrates a top view of the assembly of FIG. 5 and/or FIG. 6.

In FIG. 7, the cross section A-A is seen to traverse the top arm 410, which has a width 716 that may or may not vary across the length of the top arm 410. The cross section A-A is illustrated and discussed with regards to FIG. 9A to FIG. 9H shortly.

In FIG. 7, the side arm 420 is shown attached to the top arm 410 on two sides with a bolt 420 connecting through the assembly components of FIG. 6 without a washer 432, but held in place by the nut 434 tightened onto the bolt 430.

Figure 8:
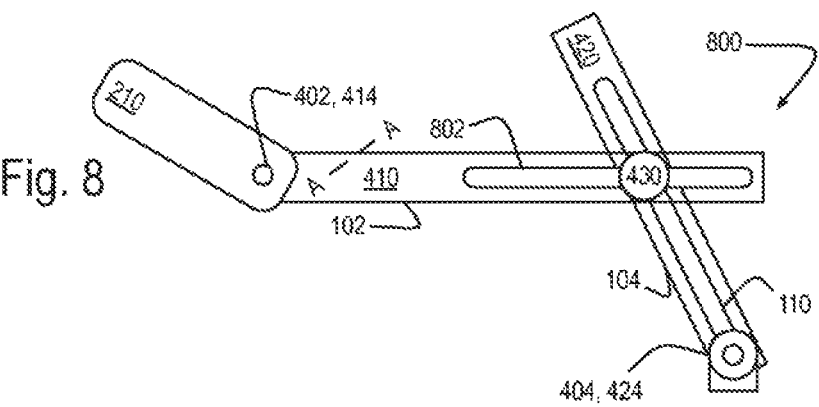
FIG. 8 illustrates an exemplary embodiment of the present invention as the cake making implement built from an assembly of the components of the kit of FIG. 4.

FIG. 8 illustrates an exemplary embodiment of the present invention as the cake making implement 800 built from an assembly of the components of the kit 400 of FIG. 4.

In FIG. 8, the cake making implement 800 includes the base 120 of FIG. 4 aligned by the base reference holes 404 to the base mounting site 424 to position the base 120 with respect to the side arm 420. The cake making implement further includes the side arm 420 coupled by a bolt 430 through the track 110 to the top arm 410. The top arm 410 includes a second track 802 through which the bolt 430 extends. As in FIG. 7, the bolt 430 is tightened through the action of a nut 434 to make the assembly rigid and operational.

In FIG. 8, the positioning of the base 120 with respect to the side arm 120 adjusts the cake making implement 800 to operate the side smoother 104 at an angle which does not have to be vertical to the cake 180 as shown in FIG. 3. By adjusting the base reference hole(s) 404 to the base mounting site 424, the side smoother 104 can be adjusted to smooth icing 190 on a cake 180 with vertical side surfaces 184 such as shown in FIG. 1A, FIG. 1B and FIG. 2.

In FIG. 8, the cake making implement 800 may include the handle 210 aligned by a handle alignment site 402 attached to the handle attachment hole(s) 414 of the top arm 410.

In FIG. 8, the cake 180 may be rotated about its center to effect simultaneous smoothing the icing 190 on the top surface 182 and the side surface 184 by the cake making implement 100. Alternatively, the cake 180 may be stationary and the cake making implement 100 may circle the cake to simultaneously smooth the icing 190 on the top surface 182 and the side surface 184.

In FIG. 8, the mostly vertical arm 108 and base 120 may be made of a plastic, preferably a food safe plastic, and/or may include a metallic surface such as stainless steel. The side smoother 104 may be made of a plastic, preferably a food safe plastic, and/or a metallic surface such as stainless steel. The top smoother 102 and/or the top arm 106 may be made of plastic, preferably a food safe plastic and/or may include a metallic surface such as stainless steel.

FIG. 9A through FIG. 9H illustrate various exemplary embodiments of the top arm 106 and/or the top arm 410 as seen through the cross-section A-A of the preceding FIGS.

In FIG. 9A, the cross section A-A of the top arm 106 and/or the top arm 410 may be essentially rectangular and may include the top smoother 102 as an essentially flat surface rounded at the sides.

In FIG. 9B, the cross section. A-A of the top arm 106 and/or the top arm 410 may be rectangular with two sides rounded and may include the top smoother 102 as a rounded surface.

In FIG. 9C, the cross section A-A of the top arm 106 and/or the top arm 410 may be essentially oval and may include the top smoother 102 as an essentially oval surface. In some further embodiments, the cross section A-A may be circular.

In FIG. 9D, the cross section A-A of the top arm 106 and/or the top arm 410 may be rectangular with opposing rounded sides away from the top smoother 102. The cross section A-A of the top arm 106 and/or the top arm 410 may include the top smoother 102 as an essentially flat surface located between the rounded sides.

In FIG. 9E, the cross section A-A of the top arm 106 and/or the top arm 410 may be essentially rectangular with a protruding finger. The cross section A-A of the top arm 106 and/or the top arm 410 may include the top smoother 102 as an essentially flat surface rounded at the sides.

In FIG. 9F, the cross section A-A of the top arm 106 and/or the top arm 410 may be rectangular with rounded sides away from the top smoother and with a protruding finger. The cross section A-A of the top arm 106 and/or the top arm 410 may include the top smoother 102 as an essentially flat surface rounded at the sides.

In FIG. 9G, the cross section A-A of the top arm 106 and/or the top arm 410 may be an oval with a protruding finger. The cross section A-A of the top arm 106 and/or the top arm 410 may include the top smoother 102 as an oval surface.

In FIG. 9H, the cross section A-A of the top arm 106 and/or the top arm 410 may be essentially triangular with rounded edges and may include the top smoother 102 as an essentially flat surface rounded at the sides.

FIG. 10A to FIG. 10H illustrate various exemplary embodiments of the mostly vertical arm 108, the side arm 310, and/or the side arm 420 as seen through the cross-section B-B of the preceding FIGS.

In FIG. 10A, the cross section B-B of the mostly vertical arm 108, the side arm 310, and/or the side arm 420 may be essentially rectangular and may include the side smoother 104 as an essentially flat surface rounded at the sides.

In FIG. 10B, the cross section B-B of the mostly vertical arm 108, the side arm 310, and/or the side arm 420 may be rectangular with two sides rounded and may include the side smoother 104 as a rounded surface.

In FIG. 10C, the cross section B-B of the mostly vertical arm 108, the side arm 310, and/or the side arm 420 may be essentially oval and may include the side smoother 104 as an essentially oval surface. In some further embodiments, the cross section B-B may be circular.

In FIG. 10D, the cross section B-B of the mostly vertical arm 108, the side arm 310, and/or the side arm 420 may be rectangular with opposing rounded sides near or opposite the side smoother 104. The cross section B-B of the mostly vertical arm 108, the side arm 310, and/or the side arm 420 may include the side smoother 104 as a rounded surface located between the essentially flat sides.

In FIG. 10E, the cross section B-B of the mostly vertical arm 108, the side arm 310, and/or the side arm 420 may be essentially rectangular with a protruding finger. The cross section B-B of the mostly vertical arm 108, the side arm 310, and/or the side arm 420 may include the side smoother 104 as an essentially flat surface rounded at the sides.

In FIG. 10F, the cross section B-B of the mostly vertical arm 108, the side arm 310, and/or the side arm 420 may be rectangular with rounded sides away from the top smoother and with a protruding finger. The cross section B-B of the mostly vertical arm 108, the side arm 310, and/or the side arm 420 may include the side smoother 104 as an essentially flat surface rounded at the sides.

In FIG. 10G, the cross section. B-B of the mostly vertical arm 108, the side arm 310, and/or the side arm 420 may be an oval with a protruding finger. The cross section B-B of the mostly vertical arm 108, the side arm 310, and/or the side arm 420 may include the side smoother 104 as an oval surface.

In FIG. 10H, the cross section B-B of the mostly vertical arm 108, the side arm 310, and/or the side arm 420 may be essentially rectangular shape merged with a triangular shape extended to a finger with rounded edges and may include the side smoother 104 as a rounded surface.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method comprising:
   (i) on a cake with a top surface and a side surface to which icing has been applied, positioning a first straight edge of a cake-making implement against the icing only on the side surface of the cake;
   (ii) positioning a second straight edge of the cake-making implement against the icing on the top surface of the cake;
   (iii) with icing on the side surface in contact with the first straight edge at the same time icing on the top surface is in contact with the second straight edge, causing relative motion between the cake and the cake-making implement, the relative motion causing the first straight edge and the second straight edge to smooth the icing on the side surface and top surface of the cake, the cake-making implement including:
   a side arm including a slot, the first straight edge, and a bottom edge, the first straight edge being parallel to the slot and a fixed distance from the slot;
   a top arm including the second straight edge, the top arm coupled to the side arm with a first fastening device cooperating with the slot; and
   a second fastening device cooperating with a guiding edge of the side arm, the guiding edge being parallel to the slot, such that the second straight edge is:
      (i) oriented perpendicularly to the first straight edge, and
      (ii) oriented in parallel with the bottom edge,
   wherein the first fastening device is moveable within the slot allowing a distance of the second straight edge from the bottom edge to be changed, and wherein the relative motion causing the first straight edge to smooth the icing only on the side surface and the second straight edge to smooth the icing on the top surface of the cake causes the creation of a right angle between the icing on the side surface and top surface of the cake.

2. The method of claim 1, wherein the relative motion between the cake and the cake-making implement includes:
   rotating the cake about a center cake axis while the cake-making implement remains stationary.

3. The method of claim 1, wherein the relative motion between the cake and the cake-making implement includes:
   moving the first straight edge with respect to the side surface while the cake remains stationary.

4. The method of claim 1, wherein the moving the cake with respect to the cake-making apparatus further comprises:
   maintaining the position of the second straight edge so that it is parallel to the top surface and maintaining the position of the first straight edge so that it is orthogonal to the top surface.

5. The method of claim 1 further comprising:
   setting a distance of the second straight edge from the bottom edge while maintaining the perpendicular orientation of the second straight edge with respect to the first straight edge, wherein the distance corresponds to a position on a scale on the side arm.

6. The method of claim 1, wherein the cake-making implement further includes:
   a base connected to the side arm such that a first plane defined by the base is perpendicular to a second plane defined by the side arm.

7. A method comprising:
   (i) on a cake with a top surface and a side surface to which icing has been applied, positioning a first straight edge of a cake-making implement against the icing on the side surface of the cake;
   (ii) positioning a second straight edge of the cake-making implement against the icing on the top surface of the cake;
   (iii) with icing on the side surface in contact with the first straight edge at the same time icing on the top surface is in contact with the second straight edge, causing relative motion between the cake and the cake-making implement, the relative motion causing the first straight edge and the second straight edge to smooth the icing on the side surface and top surface of the cake, the cake-making implement including:
   a side arm including a slot, a bottom end, and the first straight edge, the slot running parallel to the first straight edge;
   a top arm including the second straight edge, the top arm coupled to the side arm with a first fastening device and able to be pivoted about the first fastening device with respect to the side arm, the first fastening device cooperating with the slot to couple the top arm to the side arm such that:
      (i) the second straight edge is at a first angle relative to the first straight edge, the first angle being changeable, and
      (ii) the first fastening device is movable within the slot to allow the first fastening device to be fixed at a position along the slot from the bottom end, wherein the relative motion causing the first straight edge and the second straight edge to smooth the icing on the side surface and top surface of the cake causes the creation of the first angle between the icing on the side surface and top surface of the cake.

8. A cake-making implement comprising:
   a side arm including a slot, a first straight edge, and a bottom edge, the first straight edge being parallel to the slot and a fixed, non-adjustable distance from the slot;
   a top arm including a second straight edge, the top arm coupled to the side arm with a first fastening device cooperating with the slot;
   a scale disposed on the side arm parallel to the slot, the scale being incremented to indicate a distance from the second straight edge to the bottom edge; and
   a second fastening device cooperating with a guiding edge of the side arm, the guiding edge being parallel to the slot, such that the second straight edge is:
      (i) oriented perpendicularly to the first straight edge, and
      (ii) oriented in parallel with the bottom edge,
   wherein:
   the first fastening device is moveable within the slot allowing a distance of the second straight edge from the bottom edge to be changed, and
   the first straight edge and the second straight edge intersect to create a right angle such that with the first straight edge in contact with icing only on a side surface of a cake the second straight edge contacts icing only on a top surface of the cake.

9. The cake-making implement of claim 8, wherein the guiding edge is a slot edge.

10. The cake-making implement of claim 8 further including a second guiding edge, wherein the first and second guiding edges are first and second slot edges, wherein the first and second fastening devices are rivets, wherein the top arm is coupled to the side arm with the first and second fastening devices cooperating with the slot, and wherein the first and second fastening devices cooperate with the first and second slot edges such that the second straight edge is:
   (i) oriented perpendicularly to the first straight edge, and
   (ii) oriented in parallel with the bottom edge.

11. The cake-making implement of claim 8 further including a second guiding edge, wherein the first and second guiding edges are first and second slot edges, wherein the first and second fastening devices include bolts, wherein the top arm is coupled to the side arm with the first and second fastening devices cooperating with the slot, and wherein the first and second fastening devices cooperate with the first and second slot edges such that the second straight edge is:
   (i) oriented perpendicularly to the first straight edge, and
   (ii) oriented in parallel with the bottom edge.

12. The cake-making implement of claim 8, wherein the second fastening device extends from the top arm and into the slot, and wherein the guiding edge is a slot edge.

13. The cake-making implement of claim 12, wherein the second fastening device is a tab.

14. The cake-making implement of claim 8, wherein the first straight edge has one of: a square edge, a sharp edge, and a rounded edge.

15. The cake-making implement of claim 8, wherein the second straight edge has one of: a square edge, a sharp edge, and a rounded edge.

16. The implement of claim 8, wherein the cake-making implement further includes:
   a base connected to the side arm such that a first plane defined by the base is perpendicular to a second plane defined by the side arm.

17. A kit capable of being assembled into a cake-making implement, the kit comprising:
   a side arm including a slot, a first straight edge, a guiding edge, and a bottom edge, the first straight edge and the guiding edge are parallel to the slot, and the first straight edge is a fixed, non-adjustable distance from the slot;
   a top arm including a second straight edge;
   a scale disposed on the side arm parallel to the slot, the scale being incremented to indicate a distance from the second straight edge to the bottom edge;
   a first fastening device; and
   a second fastening device, the kit when assembled having:
   the top arm coupled to the side arm with the first fastening device cooperating with the slot; and
   the second fastening device cooperating with the guiding edge of the side arm such that the second straight edge is:
      (i) oriented perpendicularly to the first straight edge, and
      (ii) oriented in parallel with the bottom edge,
   wherein:
   the first fastening device is moveable within the slot allowing a distance of the second straight edge from the bottom edge to be changed, and
   the first straight edge and the second straight edge intersect to create a right angle such that with the first straight edge in contact with icing only on a side surface of a cake the second straight edge contacts icing only on a top surface of the cake.

18. The kit of claim 17, wherein the guiding edge is a slot edge.

19. The kit of claim 17 further comprising a second guiding edge, wherein the first and second guiding edges are first and second slot edges, wherein the first and second fastening devices include bolts, wherein when assembled the top arm is coupled to the side arm with the first and second fastening devices cooperating with the slot, and wherein the first and second fastening devices when assembled cooperate with the first and second slot edges such that the second straight edge is:
   (i) oriented perpendicularly to the first straight edge, and
   (ii) oriented in parallel with the bottom edge.

20. The kit of claim 17, wherein the second fastening device is a tab which when assembled extends from the top arm and into the slot, and wherein the guiding edge is a slot edge.

21. The kit of claim 17, wherein the cake-making implement further includes:
   a base connected to the side arm such that a first plane defined by the base is perpendicular to a second plane defined by the side arm.

* * * * *